(12) United States Patent
Bai

(10) Patent No.: US 9,778,129 B2
(45) Date of Patent: Oct. 3, 2017

(54) UNIVERSAL HERMETICALLY SEALED BUTTON PRESSURE SENSOR

(71) Applicant: MEMSsensors, Inc., San Jose, CA (US)

(72) Inventor: John She Bai, Los Gatos, CA (US)

(73) Assignee: DUNAN SENSING, LLC, San Jose, CA (US)

( * ) Notice: Subject to any disclaimer, the term of this patent is extended or adjusted under 35 U.S.C. 154(b) by 0 days.

(21) Appl. No.: 14/816,913

(22) Filed: Aug. 3, 2015

(65) Prior Publication Data
US 2017/0038271 A1  Feb. 9, 2017

(51) Int. Cl.
*G01L 19/14* (2006.01)
*G01L 19/00* (2006.01)

(52) U.S. Cl.
CPC ........ *G01L 19/142* (2013.01); *G01L 19/0076* (2013.01)

(58) Field of Classification Search
CPC ..... G01L 19/0084; G01L 9/0075; G01L 9/00; G01L 9/001
USPC .......................................................... 73/719
See application file for complete search history.

(56) References Cited

U.S. PATENT DOCUMENTS

| | | | | |
|---|---|---|---|---|
| 8,704,238 B2* | 4/2014 | Yang | ................... | B81C 1/00246 257/459 |
| 2005/0001324 A1* | 1/2005 | Dunn | ................... | G01L 19/0069 257/762 |
| 2005/0288596 A1* | 12/2005 | Eigler | ................... | A61B 5/0215 600/485 |
| 2008/0054383 A1* | 3/2008 | Eriksen | ................... | G01L 9/0042 257/415 |
| 2009/0278215 A1* | 11/2009 | Baldo | ................... | B81B 7/0061 257/415 |
| 2011/0006382 A1* | 1/2011 | Nakatani | ............... | G01L 9/0016 257/416 |
| 2011/0271764 A1* | 11/2011 | Lee | ...................... | G01L 19/0092 73/718 |
| 2013/0031984 A1* | 2/2013 | Jones | .................... | G01L 19/143 73/717 |
| 2013/0087863 A1* | 4/2013 | Chiou | ................... | G01L 9/0052 257/417 |
| 2013/0214365 A1* | 8/2013 | Schlarmann | .......... | G01L 9/0042 257/415 |
| 2013/0233086 A1* | 9/2013 | Besling | ..................... | G01L 9/12 73/724 |
| 2013/0277772 A1* | 10/2013 | Bryzek | ............... | B81C 1/00158 257/415 |
| 2014/0001584 A1* | 1/2014 | Liu | ..................... | B81C 1/00158 257/419 |
| 2014/0090485 A1* | 4/2014 | Feyh | .................... | G01L 9/0073 73/862.68 |

(Continued)

*Primary Examiner* — Lisa Caputo
*Assistant Examiner* — Philip Cotey
(74) *Attorney, Agent, or Firm* — Silicon Patent; Christopher C. Zhang

(57) ABSTRACT

A hermetically-sealed universal pressure sensor comprises a MEMS disk, a compensate disk, and an optional interconnect ring. The MEMS disk has one or more MEMS dies that can convert ambient pressures to electrical signals, which is processed and compensated at an integrated circuit on the compensate disk. The interconnect ring can optionally provide electrical connections and hermetic seal properties between the MEMS disk and the compensate disk.

12 Claims, 5 Drawing Sheets

(56) References Cited

U.S. PATENT DOCUMENTS

2014/0239979 A1\* 8/2014 Wygant .................. B81B 7/007
  324/658
2014/0260649 A1\* 9/2014 Petrucelli .............. G01L 9/0055
  73/726

\* cited by examiner

UNIVERSAL HERMETICALLY SEALED BUTTON PRESSURE SENSOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to pressure sensors, and are particularly related to a pressure sensor for electronically detecting and measuring pressures in a fluid environment, including gaseous and liquid substances, wherein the pressures are measured through variations in electrical resistance when resistors deform under pressure.

INTRODUCTION

Generally described, pressure sensors are devices that convert pressures in a liquid or gas into a signal, such as an electric signal. Liquid and gas are collectively referred to as fluid. Their designs include capacitive, electromagnetic, and optical, etc. They may be used in any system where electrical signals as a function of gaseous or liquid pressure is useful information, such as industrial, heating and venting (HVAC), automotive, and medical applications.

While pressure sensors vary widely in design and application, one of the common challenges in pressure sensors is providing a hermetic seal that is compact, simple, and cost-effective. Pressure sensors that provide electrical output need to provide a hermetic seal between the fluid media being measured and the electrical components.

Hopman et al (U.S. Pat. No. 8,499,642) describes a pressure sensor with a transducer, and a diaphragm. The diaphragm is attached to a support structure. A seal material around the support structure sidewall fixes a pressure-sensing transducer and provides hermetic seal.

Such design requires complex manufacturing processes and exposes many potential points of failure. In addition, the components are interlocked and provide little modularity.

What is needed is a pressure sensor that provides a hermetic seal that can be used in many different applications, can be easily manufactured at a compact size, and uses simple yet highly-modular components that also minimize the number of potential points of failure.

DETAILED DESCRIPTION

In accordance with an embodiment of the present invention, described herein is a device that measures pressures in gas or liquid using a microelectromechanical system (MEMS) die attached on a base structure. The gas can be dry or wet. The MEMS die can be bonded to the base structure. Together, the MEMS die and the base structure make up the MEMS disk. A pressure inlet opening is provided at the base structure. Outside pressure is allowed through the inlet opening. The MEMS die senses outside pressures through the inlet opening, and converts them to electrical signals.

In accordance with an embodiment, a compensate disk comprises of electrical components to provide corrections, compensations, and fine-tuning of the electrical signals generated by the MEMS die. The compensate disk comprises of integrated circuits, such as application-specific integrated circuits (ASICs), to provide the processing of the signals received from the MEMS die.

In accordance with an embodiment, an interconnect ring is attached to the MEMS disk on one side and the compensate disk on another. The interconnect ring provides hermetic seals and mechanical support between the MEMS disk and the compensate disk. Optionally, the interconnect ring can also allow electrical connections to be established between the MEMS and the compensate disks.

Figure 1:
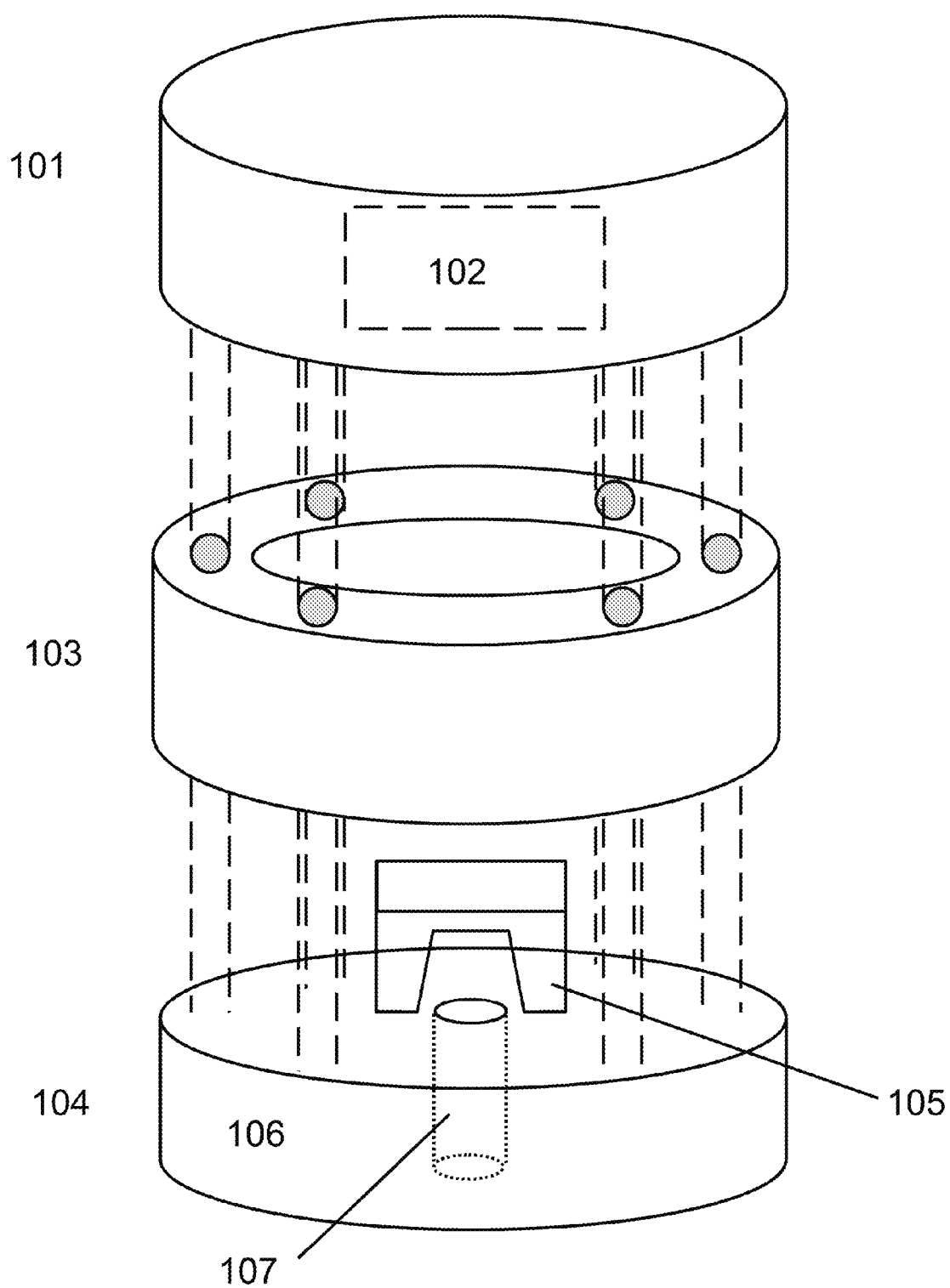
FIG. 1 illustrates an exploded view of a universal hermetically sealed button pressure sensor.

FIG. 1 illustrates an overall view of a hermetically sealed button pressure sensor, in accordance with an embodiment of the invention. As shown, the compensate disk 101 comprises an integrated circuit 102 which performs signal processing and provides additional functions such as error-elimination and compensation.

The MEMS disk 104 comprises a MEMS die 105 mounted on the support disk 106. The disk has an inlet opening 107, which allows outside pressures to come in and be felt at the MEMS die. The MEMS die then converts the pressures into electrical signals.

The interconnect ring 103 provides mechanical support and hermetic seal between the compensate disk and the MEMS disk. Optionally, one or more electrical connections between the compensate and MEMS disks can placed inside the interconnect ring.

In accordance with an embodiment of the invention, the sensor can be a sensing element, transducer, or a transmitter.

Figure 2:
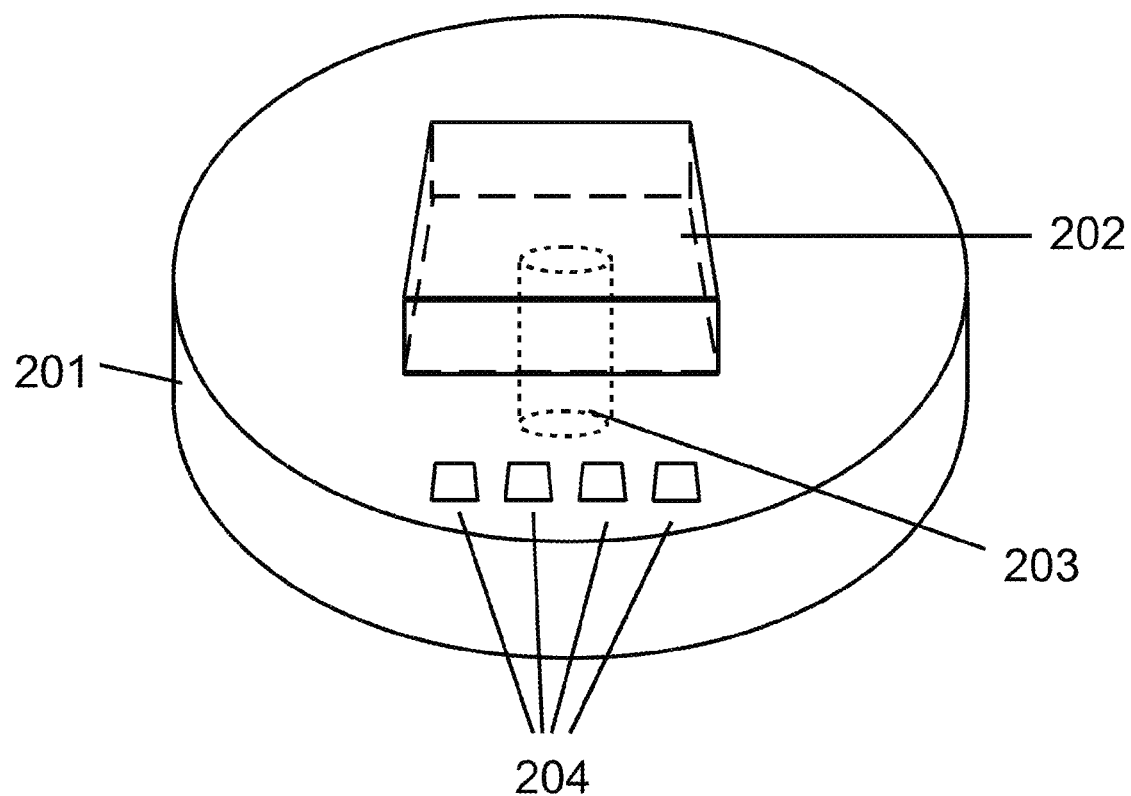
FIG. 2 illustrates a view of the MEMS disk.

FIG. 2 illustrates the MEMS disk, in accordance with an embodiment of the present invention. The MEMS disk can be housed in a base structure 201 that provides an inlet opening, such as a port, as illustrated by 203 which allows outside fluid to come in contact with the MEMS die 202. The base structure can provide conductors 204 for attaching electrical connections. The base structure can be made from a ceramic material.

Figure 3:
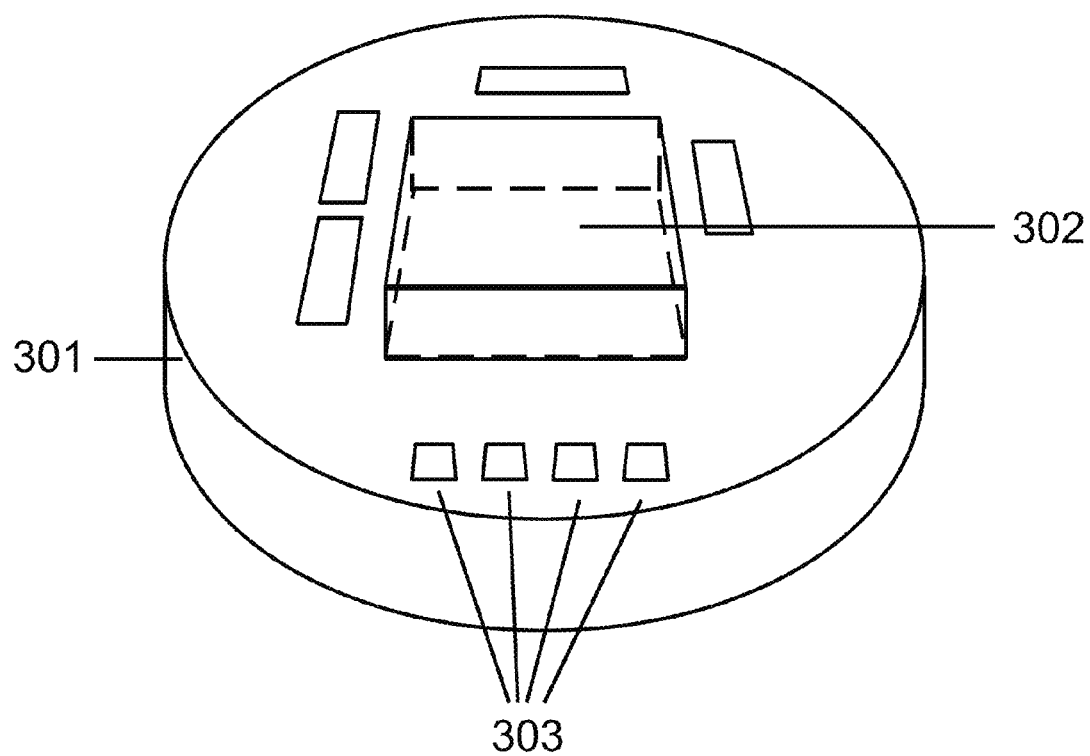
FIG. 3 illustrates a view of the compensate disk.

FIG. 3 illustrates the compensate disk, in accordance with an embodiment of the present invention. For illustration purposes, the compensate disk is inverted. As shown in FIG. 3, the top side of the compensate disk faces the MEMS disk.

The compensate disk comprises a base structure 301 that provides support for integrated circuits 302, and conductors 303 for attaching electrical connections. The integrated circuit can perform a number of specified error-correction and calculations.

Figure 4:
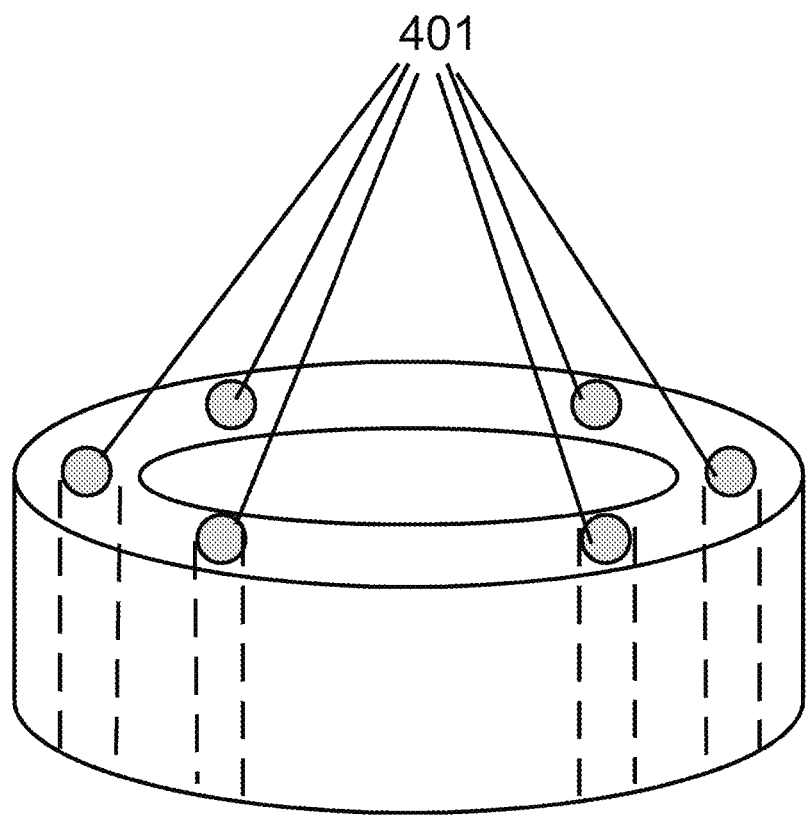
FIG. 4 illustrates a view of the interconnect ring.

FIG. 4 illustrates the interconnect ring, in accordance with an embodiment of the present invention. Viewing from the top, the interconnect ring can be circular in shape, but can also take on other shapes including but not limited to oval, rectangular, or square. The interconnect ring can be hollow in the center, as shown in FIG. 4. Alternatively, the ring can be solid in the center.

The interconnect ring can have a number of cavities 401 along its edge. The cavities can provide spacing for electrical connections, such as cables or wires, between the MEMS and the compensate disks.

In accordance with an embodiment of the present invention, there is no interconnect ring, and the MEMS and ASIC discs are directly attached. In accordance with another embodiment of the present invention, the interconnect ring and the MEMS disk can be constructed in one piece.

Figure 5:
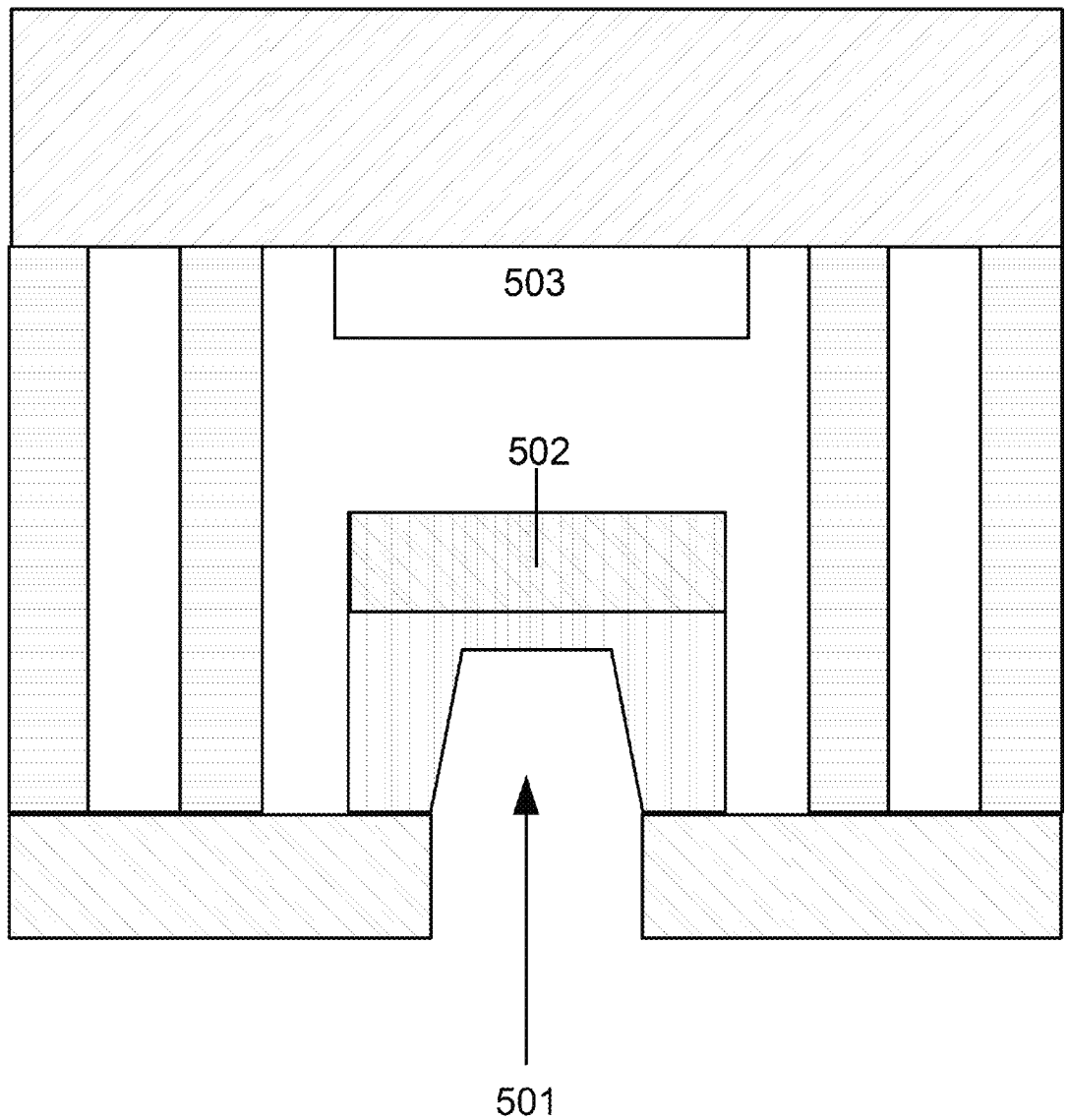
FIG. 5 illustrates a side view of the button pressure sensor.

FIG. 5 illustrates a side view of the pressure sensor. An outside pressure, indicated by the arrow 501 can be allowed into the inlet opening on the MEMS disk. Within the MEMS die 502 are a number of internal resistors. The resistors are electrically connected to the integrated chip 503, which is located at the compensate disk.

In accordance with an embodiment of the present invention, a button pressure sensor can operate as follows. The MEMS disk is exposed to a fluid in gaseous or liquid state having pressures on its exterior side. The disk has an inlet opening to allow the pressure come into its interior side. The MEMS die is hermetically sealed at the inlet opening on the interior side, thus the fluid cannot leak into other critical components on the interior side of the pressure sensor.

There are a number of internal resistors located within the MEMS die. The internal resistors can receive power from an outside source, such as the integrated circuits on the compensate disk.

The bottom side of the MEMS die, i.e., the side where the MEMS die is attached to the base structure, is exposed to the outside pressure. The outside pressure can bend or deform the MEMS die, including the resistors. The deformity causes the resistors' resistance value to change. This change of resistance is detected as a change in electrical voltage or current flowing through the resistors. Because the resistors are electrically connected to the integrated circuits on the compensate disk, the integrated circuits can process this change as detected pressure values. The integrated circuit can perform additional logical processing and error correction, and performs required actions as programmed in the circuit.

To ensure a hermetic seals, the components can be made from materials that have the same or similar thermal-expansion properties. The bonding process can utilize one or more of the soldering, welding, gluing, chemical and compression techniques.

Embodiments of the present invention may be conveniently manufactured using one or more conventional general purpose or specialized processes. Appropriate hardware and software coding can readily be prepared by skilled persons based on the teachings of the present disclosure, as will be apparent to those skilled in the art.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A pressure sensing system, comprising:
a MEMS disk, comprising a base structure having one or more port openings, and one or more MEMS dies, attached to the base structure, wherein each of the MEMS dies consists of a flat and solid top side and a bottom side having an open cavity, and each of the MEMS dies is attached and hermatically sealed to the MEMS disk at the bottom cavity side, wherein the MEMS dies are configured to:
receiving one or more input electrical voltages at the top side,
remain free from fluid pressure or mechanical compression at the top side,
sensing one or more pressures from a fluid exerted into the open cavity at the bottom side of the MEMs die, wherein the fluid is contained within the cavity, and
converting the pressures to one or more output electrical voltages; and
a compensate disk comprising one or more integrated circuits, which are electrically connected to said MEMS dies and capable of receiving electrical signals from said MEMS dies.

2. The system of claim 1, further comprising an interconnect structure having one or more electrical connections, a first surface, and a second surface, wherein
the electrical connections are exposed at the first surface and the second surface,
the MEMS dies are connected to the first surface, and
the integrated circuit is electrically connected to the second surface.

3. The system of claim 1, wherein the one or more protrusions are attached to the top side of each of the MEMS dies, wherein said protrusions contain one or more electrical connections that are electrically connected to said MEMS dies.

4. The system of claim 1, wherein the MEMS dies are exposed to one or more pressures, which are constantly monitored and updated.

5. The system of claim 1, wherein instructions are stored on the one more integrated circuits, and wherein when the instructions, when executed, corrects for one or more errors in the output electrical voltages sent from the MEMS dies.

6. The system of claim 1, wherein the base structure of the MEMS disk is of a ceramic material.

7. The system of claim 1, wherein the integrated circuits act as transducers.

8. The system of claim 1, wherein the integrated circuits act as transmitters.

9. The system of claim 1, wherein the integrated circuits act as sensing elements.

10. The system of claim 1, wherein the MEMS disk further comprises one or more electrical conductors electrically connected to the MEMS dies.

11. The system of claim 1, wherein the compensate disk further comprises one or more electrical conductors electrically connected to the integrated circuit.

12. A method for measuring one or more pressures in a fluid, comprising the steps of:
attaching one or more MEMS dies to a base structure with one or more port openings, wherein each of the MEMS dies consists of a flat and solid top side and a bottom side having an open cavity, and each of the MEMS dies is attached and hermatically sealed to the MEMS disk at the bottom cavity side;
sending one or more electrical voltages to the top side of the MEMS dies;
keeping the top side free from any fluid pressure or mechanical compression;
exposing the cavity at the bottom side of the MEMS dies to the fluid, wherein the fluid is contained within the cavity;
detecting a change in electrical resistance in the MEMS dies; and converting the change in electrical resistance to one or more pressure values at one or more integrated circuits.

\* \* \* \* \*